United States Patent [19]

Marus

[11] 4,163,270
[45] Jul. 31, 1979

[54] SAFETY APPARATUS FOR USE WITH A THREE-PHASE AC MOTOR

[76] Inventor: Louis J. Marus, 9151 Riverbluff Rd., Millington, Tenn. 38053

[21] Appl. No.: 872,886

[22] Filed: Jan. 27, 1978

[51] Int. Cl.$^2$ .............................................. H02H 3/26
[52] U.S. Cl. ...................................... 361/77; 318/289
[58] Field of Search .................... 361/76, 77; 307/178; 318/256, 289

[56] References Cited
U.S. PATENT DOCUMENTS

| 3,218,485 | 11/1965 | Takai | 361/76 X |
| 4,021,704 | 5/1977 | Norbeck | 361/77 |

Primary Examiner—Harry E. Moose, Jr.
Attorney, Agent, or Firm—Kalish & Gilster

[57] ABSTRACT

Safety apparatus for use with a three-phase AC hoist motor adapted to be connected to a three-phase AC power source, motor rotation being correct if the motor is connected to the source in correctly phased relationship but incorrect if connected with an incorrectly phased relationship.

Phase detection circuitry is provided for detecting the phase relationship of said AC power provided by the power source connection and for providing a signal indicative of an incorrect phase relationship. Phase corrector circuitry of the apparatus is operative when enabled for correcting the phase relationship of the AC power provided from said source to the motor. Circuitry is included for functionally interconnecting the phase detector circuitry and the phase corrector circuitry for enabling operation of the latter in response to said signal, thereby ensuring operation of the motor in a correct direction regardless of incorrect phasing provided by the connection to the power source.

9 Claims, 6 Drawing Figures

SAFETY APPARATUS FOR USE WITH A THREE-PHASE AC MOTOR

BACKGROUND OF THE INVENTION

This invention relates in general to controls for three-phase AC motors and, more particularly, to safety apparatus for controlling the direction of movement of a three-phase AC reversible direction hoist motor.

Three-phase AC motors are frequently encountered in industrial applications for driving hoists and other machinery. Such motors may, for example, be of the "squirrel-cage" induction type. These motors rotate in one direction upon the application of three-phase AC power to the motor, there conventionally being three motor leads. However, such a motor will operate in a reverse direction if any two of the three leads which supply power to the motor are reversed.

In most installations, the direction of rotation of the motor must be correctly predetermined in order for there to be proper and safe operation of machinery connected to and driven by the motor. In the case of a reversible-direction hoist, such as a chain hoist for lifting heavy loads, control of the motor is conventionally through the use of a motor control switch which may be moved to one direction for a first direction of movement of the hoist, and to another position for an opposite direction of hoist movement. As an example, the control switch may control the up and down movements of the hoist.

The direction of rotation of such motors may, therefore, be reversed by operating the control switch. However, the control switch is typically provided with indicia for the control positions, signifying the direction of movement to be effected upon movement of the control for the position thus marked. For example, a chain hoist may have a switch with positions marked "up" and "down." Whether the hoist will, in fact, move up or down if the hoist control switch is placed in these respective positions is entirely dependent, however, upon whether the AC motor wiring has been properly connected to a three-phase AC power source by a correct three lead wiring connection. If the wiring connection has been improperly carried out so as to be incorrect, the motor circuits thus connected may be said to be improperly phased. As a result, operation of the control switch to produce rotation of the motor in a desired direction will produce movement in the incorrect direction.

Now it ratherly frequently occurs that mistakes are made in wiring three-phase machinery of the present type resulting in a wiring connection of the motor circuits to an AC power distribution system which is incorrect. Such mistakes may be the result of a lack of knowledge or inexperience on the part of electricians or the result of simple inadvertence. Nevertheless, if the motor is incorrectly phased by such an improper connection, the electric motor hoist will move in the direction opposite from that selected. If the hoist control switch is moved to its "up" position, the hoisting apparatus will be lowered, presenting at the very least operator confusion and annoyance or, more likely, the possibility of damage to the hoisting machinery and the loads lifted or lowered by it. Even worse, there is also the possibility that such improper direction will endanger the safety and well-being of employees and thereby constitute a very real safety hazard. For example, rather than being raised as intended, a load may be lowered upon an employee, with consequent injury to such employee.

As an illustration of the damage to the hoisting machinery which may occur as a result of such an incorrect connection to the AC power source, it should be understood that hoists are sometimes designed so that continued operation in one direction beyond a predetermined extent may not be physically possible. Thus, in the case of a chain hoist, the operation in an incorrect direction may run the chain out of the hoist pulley with consequent damage to the hoist, notwithstanding the safety hazard implicit in such possibility.

When hoists are first placed in operation, i.e., when newly installed or after repairs, incorrect connection of such apparatus to the three-phase AC power source has resulted in the hoist not being properly phased and the resultant movement in the wrong direction in some cases has actually caused the hoists to be severely damaged or torn up. Such damage is expensive and time-consuming to correct.

Such problems of incorrect phasing of three-phase equipment have long been present and are not infrequently encountered.

SUMMARY OF THE INVENTION

It is an object of the present invention to provide safety apparatus for correcting the phasing of a three-phase AC motor.

It is a further object of the invention to provide such apparatus which will ensure operation of a three-phase AC motor in a correct direction regardless of an incorrect phase relationship provided by a wiring connection of said motor to a three-phase AC power source.

A related object is the provision of such apparatus which effectively precludes operation of such motor in an incorrect direction and is automatic in doing so yet does not interrupt operation of the motor and does not shut down or disable the motor.

It is a still further object of the invention to provide such apparatus for use with a three-phase AC reversible direction hoist motor for ensuring that the direction of movement of a hoist driven by said motor is correct regardless of whether the motor has been correctly or incorrectly connected to a three-phase AC power source.

Another object of the invention is the provision of such apparatus which conduces to most facile installation in existing three-phase machinery yet which does not interfere with normal operation of such machinery.

Yet another object of the invention is to provide such apparatus which is normally inoperative unless an incorrectly phased connection of the AC motor to the three-phase power source has been made.

A further object of the invention is the provision of such apparatus which provides a high degree of selectivity in distinguishing between a correctly phased and incorrectly phased connection of such motor to the power source.

Another object of the invention is the provision of such apparatus including the features for signalling whether phasing is incorrect, as well as for signalling whether phasing of the connection is correct.

A further object of the invention is the provision of such apparatus providing electrical isolation between its various elements so as to provide a high degree of safety in use and maintenance of the apparatus.

A still further object of the invention is the provision of such apparatus which has relatively few parts, and which is inherently reliable and long lasting in operation.

Yet another object of the invention is the provision of apparatus for ensuring correct rotational direction of a three-phase AC reversible direction hoist motor which economically and advantageously incorporates low-cost commercially available components in a most efficacious and advantageous new manner.

Other objects will be in part apparent and in part pointed out hereinbelow.

DESCRIPTION OF THE PREFERRED EMBODIMENTS

Figure 1:
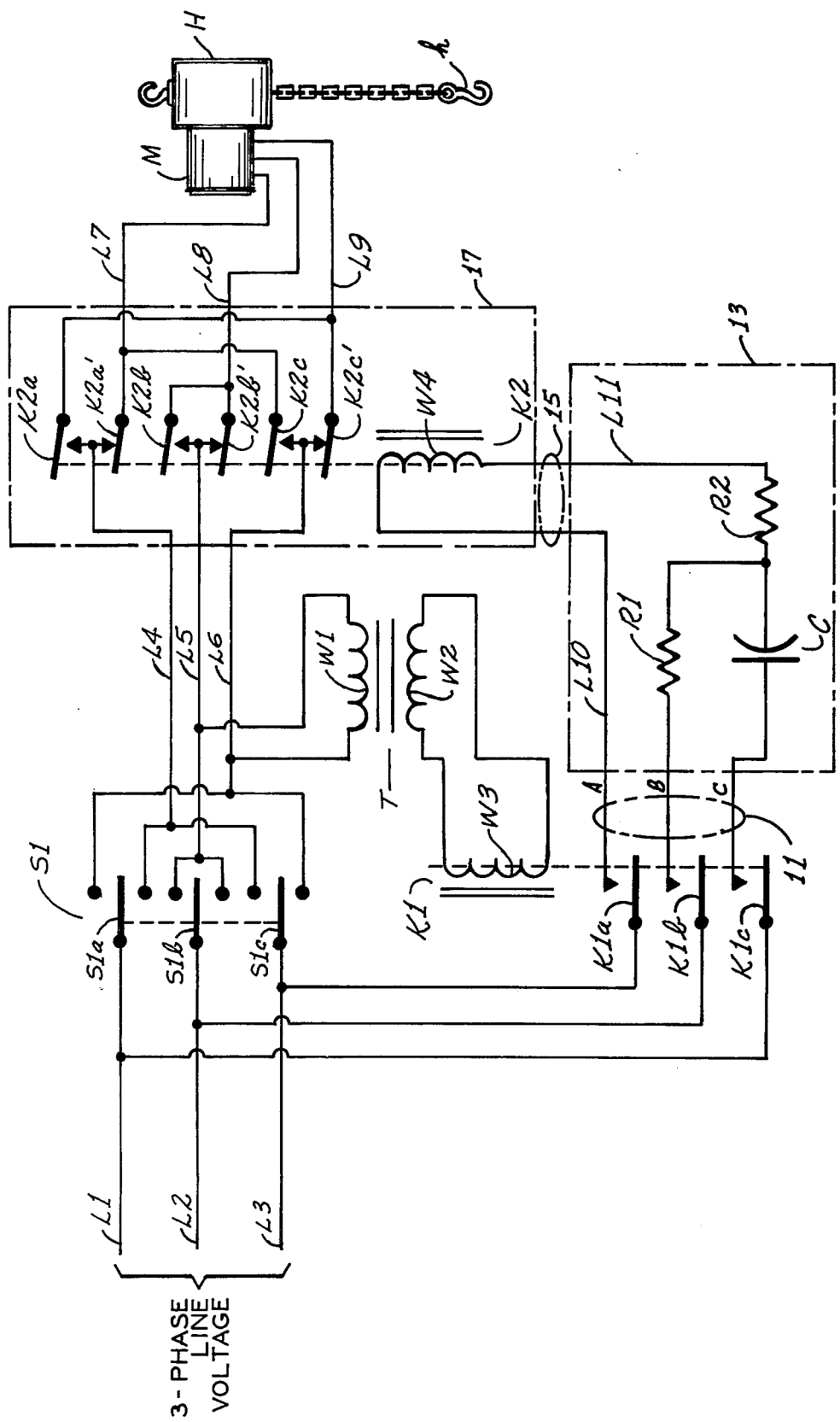
FIG. 1 is a schematic circuit diagram of a first embodiment of the present invention shown interconnected with a three-phase AC hoist motor and a motor control switch.

Referring now to FIG. 1, a first embodiment of safety apparatus of the present invention is shown interconnected with a three-phase AC hoist motor M which drives a chain hoist H, having a hook h. The motor is adapted to be connected to a three-phase line voltage at 240 volts, nominally, provided by a conventional electric power distribution system for the purpose of operating the motor. Connection is made by three leads L1, L2 and L3 providing a three lead wiring connection to the AC source. The usual switchgear and fuse or circuit breaker devices may be interconnected with leads L1, L2 and L3 or they may instead be directly connected to a power distribution network which latter network may supply line voltage to devices in addition to motor M.

It will be understood that the motor is of a reversible type and may, for example, be a conventional squirrel-cage induction motor. Accordingly, the hook h of hoist H may be moved up or down in accordance with the direction of rotation of the motor. For this purpose, the three motor leads L7, L8 and L9 are interconnected in a manner which will be described via relay contacts, with a multiple pole motor control switch S1. Leads L4, L5 and L6 are shown extending from the switch and, as will become more apparent from the following description, are connected by the sets of relay contacts to leads L7, L8 and L9 in a predetermined relationship.

Switch S1 is of a multiple pole, double throw type having a center-off position and providing alternate closed positions for selective reversal of the direction of motor M for controlling movement of the hoist in one direction or the opposite direction. Although the motor M is depicted driving a hoist H, other types of machinery or apparatus may be driven by the motor but, in any event, switch S1 will control the direction of movement of the apparatus driven by motor M.

The poles of the switch are represented by switch blades S1a, S1b, and S1c which are respectively interconnected with power leads L1 and L2 and L3. In the center-off position, the switch blades, as illustrated, are not in contact with any of the respective leads L4, L5 and L6. Hence, no power is provided to motor M for operation thereof. Accordingly, the latter leads and the three motor leads L7, L8 and L9 are disconnected from the AC power source when the switch is in its center-off position.

Switch S1 is so wired that when the switch contacts S1a, S1b and S1c, which may be ganged together in suitable fashion, are each moved in the upward direction, leads L1, L2 and L3 are interconnected with leads L6, L5 and L4, respectively. In the alternate closed position of the switch, i.e., when the switch blades thereof are moved to lower position, power leads L1, L2 and L3 are interconnected with leads L4, L5 and L6, respectively.

As will be understood, leads L1, L2 and L3 provide a three-lead wiring connection to the AC power source for operating the motor. Although it is conventional for such leads to be so marked such as with indicia or color coding in order to provide an electrician with a known phase relationship when connected to line voltage, it is possible through lack of knowledge or simple advertence to connect such leads so that they provide an incorrect phase relationship.

Apparatus of the present invention includes a relay K1 having a winding W3 adapted, when energized, to close a plurality of contact sets K1a, K1b, and K1c which are respectively interconnected with leads L1, L2 and L3. Although this relay may be of the type adapted to be energized by the line voltage, it is preferred in accordance with this embodiment that transformer K1 be of a low voltage type. Accordingly, relay winding W3 is connected in series with the secondary winding W2 of a step down transformer T. The primary winding W1 of this transformer is connected across leads L5 and L6. Accordingly, the contact sets of K1a, K1b and K1c are each opened so long as the motor control switch S1 is in the center-off position illustrated wherein no voltage is applied across leads L5 and L6. However, there will be voltage present across these leads when the control switch S1 is in either of its alternate closed positions for operation of motor M.

Contacts K1a, K1b and K1c provide an AC power from leads L1, L2 and L3 via three corresponding leads collectively designated 11 to phase detector means 13 of the present invention, said means 13 serving the function of detecting the phase relationship of the AC power provided by the wiring connection made via leads L1, L2 and L3 and providing a signal indicative of an incorrect phase relationship provided by such wiring connection.

The phase relationship provided by leads L1, L2 and L3 may be associated with an arbitrary alphabetic notation A, B and C ascribed to the input leads 11 of means 13 in order to indicate a desired or correct phase sequence, i.e., a correct order in which the voltages of these three lines reach their positive maximum values. In this regard it should be understood that in conventional three-phase power systems the voltage phase relationship between any two of the three phases is 120°. Where the phase relationship or phase sequence of the voltages appearing on leads L1, L2 and L3 is of the phase sequence ABC as such notation is shown in FIG. 1, the leads L1, L2 and L3 may be said to be connected to the AC source so as to provide a correct phase relationship and such relationship may be termed correctly "phased" for the purposes of this description.

An incorrectly phased relationship may be represented by the alphabetic notation CBA and if the leads are connected to the power source by an incorrect wiring connection which provides such incorrect phased relationship, it will be apparent that the motor M will operate at an incorrect direction. Thus, a phase sequence of CBA may be termed, for the purposes of this description, to be one which results from an incorrectly "phased" connection of leads L1, L2 and L3 to the AC power source.

The phase detector circuitry 13 comprises a resistive capacitive network comprising resistors R1 and R2 and a capacitor C1. These inputs 11 thereto are respectively interconnected via contacts sets K1a, K1b and K1c (when the latter are closed) to the power input leads L1, L2, and L3. This network has a pair of output leads L10 and L11 providing a voltage therebetween as long as contacts K1a, K1b and K1c are closed. This voltage has a first level indicative of a correct phase relationship provided by the wiring connection of leads L1, L2 and L3 but a second level indicative of an incorrect phase relationship provided by such wiring connection. There is, of course, no voltage across output leads L10 and L11 if relay winding W3 is not energized, as when control switch S1 is in the neutral position shown on either closed position of switch S1. However the presence of a voltage of said second level across leads L10 and L11 provides a signal indicative of an incorrect phase relationship provided by the wiring connection of the power input leads.

The output of the phase detector circuitry 13 is provided by a pair of output leads 15 which serve as means for connecting circuitry 13 with phase corrector means 17 of the present apparatus. Means 17 is adapted when enabled for correcting the phase relationship of the AC power from the power source provided to motor M. In other words, a signal from the phase collector means 13 is functionally provided for the phase corrector means 17, for enabling operation of the latter. Such means 17 includes circuitry comprising a relay K2 having relay contact sets designated K2a, K2a'; K2b, K2b'; K2c, and K2c' and a winding W4 interconnected with leads L10 and L11 for operating the contact sets. Although relay K2 is shown (for the purposes of exposition only) as having its sets of relay contacts associated with each of the three motor leads L7, L8 and L9, these relay contacts need only be interconnected with any two of said motor leads. But these contacts are, in any event, connected with the leads so as to be normally operative to provide a first circuit interconnection of each of two of the motor leads, e.g., leads L7 and L9, with a respective one of two of the leads provided by the wiring connection. Such leads are represented in this case by leads L4 and L6 extending from control switch S1. The contact sets of relay K2 are cooperatively actuable when relay winding W4 is energized, thereby enabling operation of the relay to provide a reversed circuit interconnection of each of said two motor leads (L7 and L9) with a respective opposite one of said two leads of the wiring connection (i.e., leads L6 and L4, respectively). Thus, it will be apparent that the sets of contacts of relay K2 are not actuated unless relay winding W4 is energized but, when actuated, in effect, reverse the interconnection of two of the motor leads with the input leads provided by the wiring connection with the source of AC line voltage.

When such a reversal of the interconnection of two of the motor leads is made, the normal direction of rotation of the motor which otherwise would be provided in the absence of such reversal upon AC power being supplied thereto is effectively reversed. Accordingly, the phase sequence of the three-phase AC voltage supplied to the motor will be corrected so as to provide for correct rotation of the motor.

Hence, the circuitry illustrated in FIG. 1 is more specifically seen to operate as follows: If it is assumed that control switch S1 is in the center-off position, shown, no AC voltage is provided to the motor supply leads L4, L5 and L6. However, if switch S1 is moved to either of its closed positions for moving the hoist either up or down, respectively, AC voltage will be present across leads L5 and L6 for energizing winding W1 of the step down transformer T. This energizes winding W3 of relay K1 and thereby actuates contact sets K1a, K1b and K1c and provides the three-phase line voltage across the three input leads designated 11 and thence to the phase detector circuitry.

If the wiring interconnection of leads L1 and L2 and L3 with the AC line voltage has been correctly made, a correct phase sequence ABC results. As a result, the vector addition of the AC voltages appearing across the three input leads which takes place in the resistive-capacitive network 13 causes a voltage to appear across leads L10 and L11 having an average value of about 95 volts, such level being somewhat dependent upon the relative values of components R1 and R2 and C1 which are selected as a matter of design preference.

However, if it is assumed that an incorrect wiring interconnection of leads L1, L2 and L3 has been made, an incorrect phase sequence CBA results. In this case, the vector addition of the voltages across these three input leads by the resistive-capacitive phase detection circuitry provides an average voltage between leads L10 and L11, which averages about 110 volts, again dependent to some extent upon the relative values of the circuit components of the phase detector network. Accordingly, it is desired that the relay K2 be relatively insensitive to voltages of the first level, i.e., about 95 volts, so as to prevent actuation of the relay contact as the lower voltage level is provided across the relay winding.

Assuming, however, that such an incorrect phase sequence causes the energization of relay winding W4, the sets of relay contacts of relay K2 are actuated. When this occurs contact set K2a closes while contact set K2a' opens. This connects lead L4 from lead L7 and connects it instead to lead L9. Inasmuch as both of the sets of contacts K2b and K2b' are both connected to L8, no change is made in its connection to lead L5. It will be appreciated, therefore, that this latter pair of contacts is redundant or not functionally necessary. They have been shown in order merely to illustrate how any one of the three motor leads L7, L8 and L9 may be connected directly to one of the supply leads L4, L5 or L6 without an intervening set of relay contacts for polarity reversal. Relay contact sets K2c and K2c' close and open, respectively, and thereby change the connection of lead L6 from lead L9 to lead L7.

From the foregoing it will be evident that relay K2 and its associated contacts effectively function as phase corrector means operative when enabled for connecting the phase relationship of the AC power from the line voltage power source provided to motor M by reversing the polarity of two leads connected thereto. Hence, the present apparatus ensures operation of the motor in a correct direction, regardless of an incorrect phase relationship provided by the wiring connection of leads L1, L2 and L3.

Figure 2:
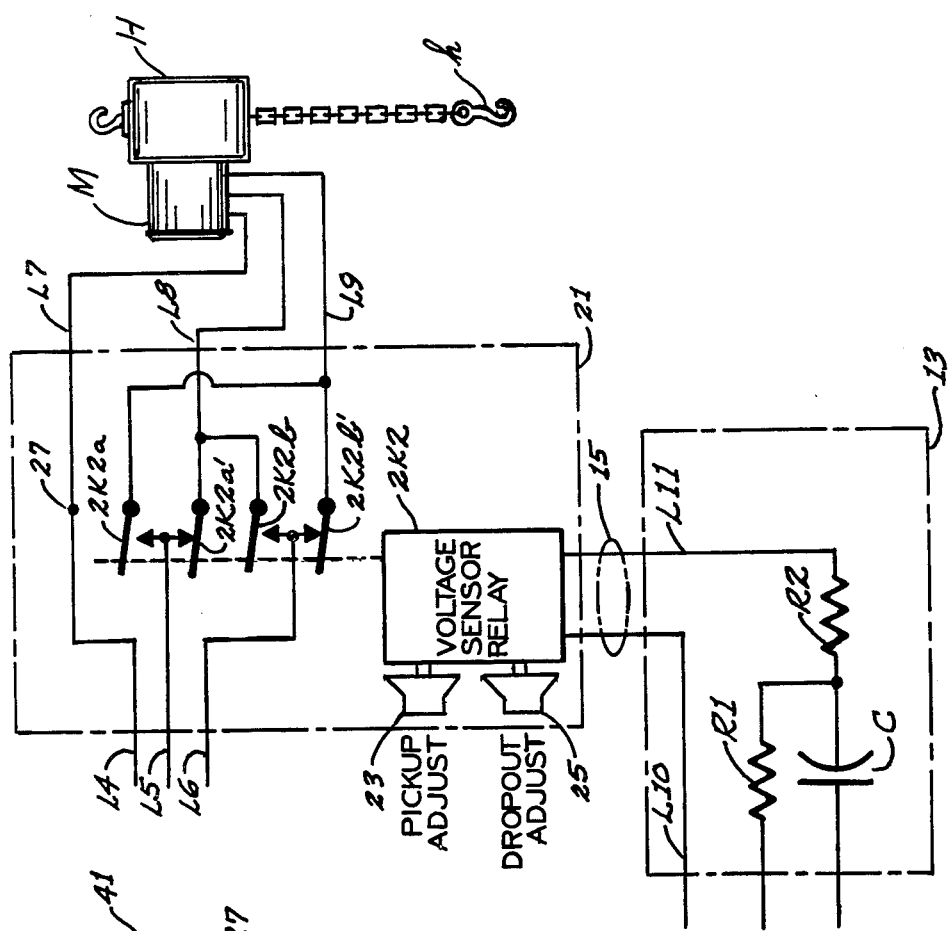
FIG. 2 is a schematic circuit diagram similar to portions of FIG. 1 but illustrating an alternative configuration of a phase corrector means of the present invention.

FIG. 2 illustrates a modification of the apparatus of FIG. 1 wherein the phase corrector circuitry for correcting the phase relationship of the AC power provided by the power source to the motor is designated 21. In this circuit, rather than utilizing a conventional electro-mechanical relay like that designated at K2 in FIG. 1, there is employed a voltage sensor relay 2K2 adapted to be particularly responsive to the preselected voltages across the output 15 of the phase detector circuitry 13. Such voltage sensor relay 2K2 may be a commercially available type, such as adjustable AC voltage sensor type CSJ 38-7001. available from the Potter and Brumfield Company. Such a device has a so-called pickup adjustment 23 and dropout adjustment 25 which permit the pickup and dropout voltages of the relay, i.e., its energization and deenergization voltage to be preset.

As a matter of illustration, assuming use in FIG. 2 of the same phase detector circuitry 13 as described regarding FIG. 1, it is preferred that the pickup setting of relay 2K2 be approximately at or below the higher level output which is present across leads L10 and L11 when an improper phase relationship results, and that the dropout setting be approximately at or slightly above the lower voltage which is present across these leads when a correct phase relationship is present.

Such device 2K2 has sets of relay contacts K2a, K2a' and K2b, K2b' which are actuated at the pick up voltage of the device. These sets of contacts, although actually a part of device 2K2, are separately illustrated as interconnected with leads L8 and L9 and normally interconnect these leads with incoming power leads L5, L6, respectively. Upon energization of the voltage sensor device 2K2 at the pickup level voltage, these contacts effectively interchange these power leads so that lead K8 is interconnected with lead L5 so as to provide for correct phasing of the power supplied to motor M. It may be noted that since only two of the motor leads need to have their connections to the incoming power leads reversed, the third motor lead L7 is directly interconnected with incoming power lead L4 by means of a terminal 17, for the reasons explained previously.

The circuit arrangement of FIG. 2 provides increased selectivity in responding to an incorrect phase relationship resulting from an improper wiring connection of main power leads L1, L2 and L3 (FIG. 1) to the AC line voltage.

Figure 3:
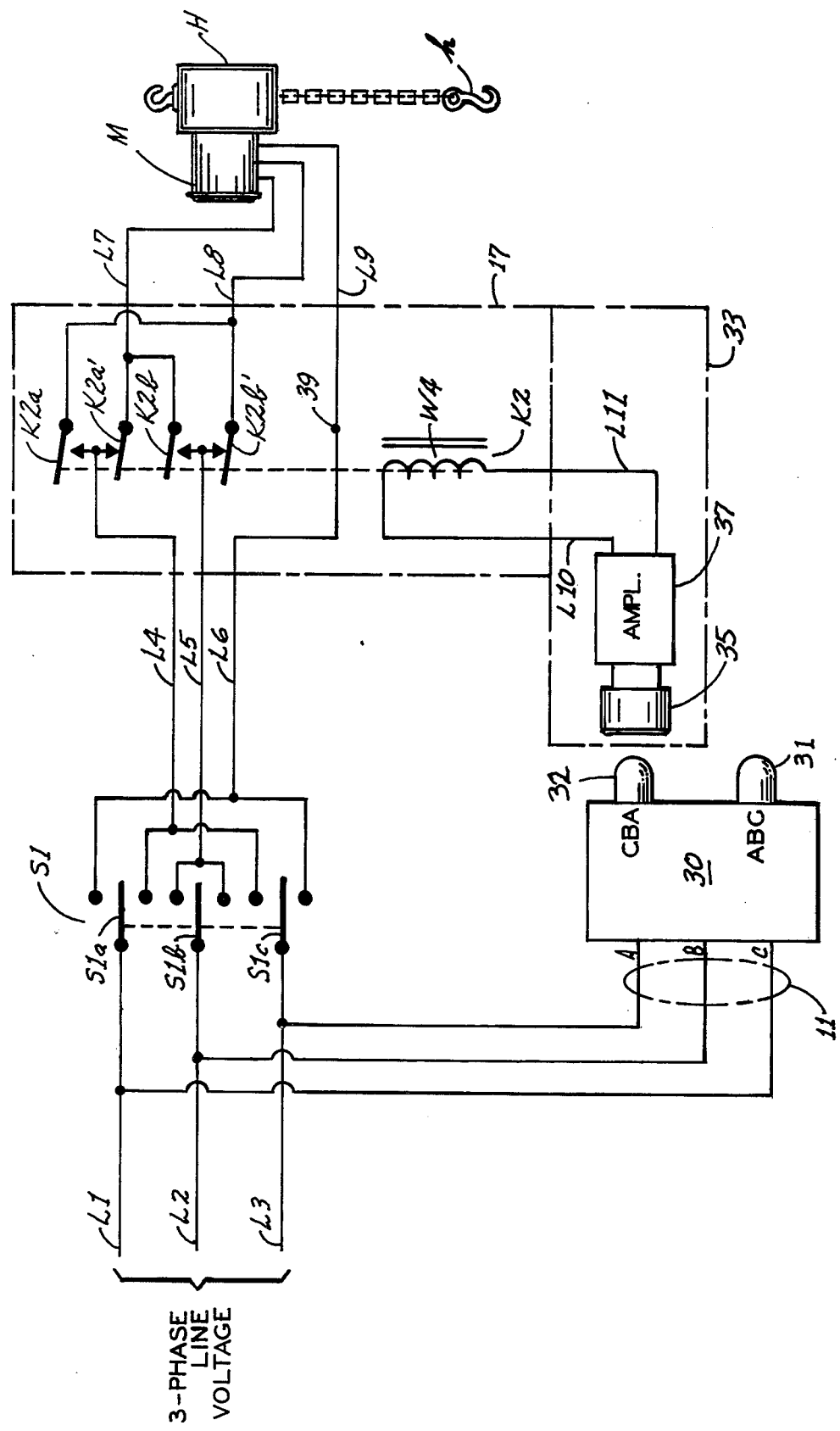
FIG. 3 is a schematic circuit diagram of another embodiment of the invention shown interconnected with a three-phase AC hoist motor and a motor control switch.

FIG. 3 illustrates another embodiment of apparatus of the present invention with circuit arrangement having an alternative phase detector means 30 for detecting the phase relationship of the AC power provided by the wiring connection of leads L1, L2 and L3 and for providing also a signal indicative of an incorrect phase relationship if such is the result of the wiring connection. The circuitry of phase detector means 30 is described in detail hereinbelow but, for the present purposes, may be noted as having three inputs, again collectively designated 11, and having two incandescent signal lights 31 and 32. Light 31 is illuminated if a phase sequence ABC results from interconnection of leads L1, L2 and L3 with the AC power source thereby signalling that the wiring connection will provide a correct phase relationship of the AC power for energizing motor M. A second light 32 is provided for signalling if the phase relationship is incorrect, as is represented by the phase sequence CBA.

Indicated by means of a block designated 33 is circuitry serving as means functionally interconnecting the phase detector means 33 and the phase corrector means or circuitry 17 for enabling operation of the phase corrector circuitry, i.e., relay K2, in response to a signal represented by the illumination of light 32. For this purpose, means 33 includes a photocell 35 of a photovoltaic type, such photocell thereby providing a voltage output when receiving light from light 32.

Interconnected with the photovoltaic cell 35 is a suitable amplifier 37 or other suitable device, such as a thyristor or other semiconductor switching circuit, for providing sufficient amplification of the photocell 35 to relay winding W4.

As will be understood, light 32 provides a source of light for detection by photocell 35 only if there is an incorrect phase relationship, as represented by the alphabetic notation CBA. If power input leads L1, L2 and L3 have been correctly wired so as to provide a correct phase relationship for supplying AC power to motor M, it will be apparent that light 31 is illuminated rather than light 32 thereby signifying that a correct wiring connection is in effect.

Operation is such that if an incorrect wiring connection has been made, light 32 will be illuminated. Such illumination will cause photocell 35 to provide a signal which is suitably amplified by amplifier 37 for causing the energization of relay K2. When the winding W4 thereof is energized, relay contact sets K2a, K2a', K2b and K2b' effectively reverse the connection of motor leads L7 and L8 to power input leads L4 and L5, respectively. Inasmuch as only two of the motor leads need to be reversed to correct the phase relationship of the AC power supply to the motor for correct rotation thereof, one motor lead L9 is connected directly to power lead L6 by means of a terminal 39.

Certain advantages accrue from use of this circuit embodiment. Because excellent electrical isolation between the phase detector means 30 and phase corrector means 17 is provided by this light source and photocell arrangement, there is a high degree of safety inasmuch as maintenance personnel or others who may have occasion to adjust or repair the hoist motor circuits or phase corrector circuitry will not be exposed to the line voltage which is always present on input leads L1, L2 and L3.

In addition, a visual indication of an correct or incorrect phase relationship characteristic of the wiring connection will be at all times be apparent if the apparatus is suitably housed so that lights 31 and 32 may be seen by operating or maintenance personnel. Hence, such personnel may easily and conveniently determine even from a distance whether the phasing of the wiring is correct or incorrect. If the latter, such personnel will then know that the wiring preferably should be corrected, so that it will not be required to maintain energization of the phase corrector relay over an overly long period which might shorten its life.

Although a conventional relay K2 of the type previously described is shown in FIG. 3, it should be understood that a voltage sensor device of the type illustrated in FIG. 2 may instead be employed in the embodiment of FIG. 3.

Figure 4:
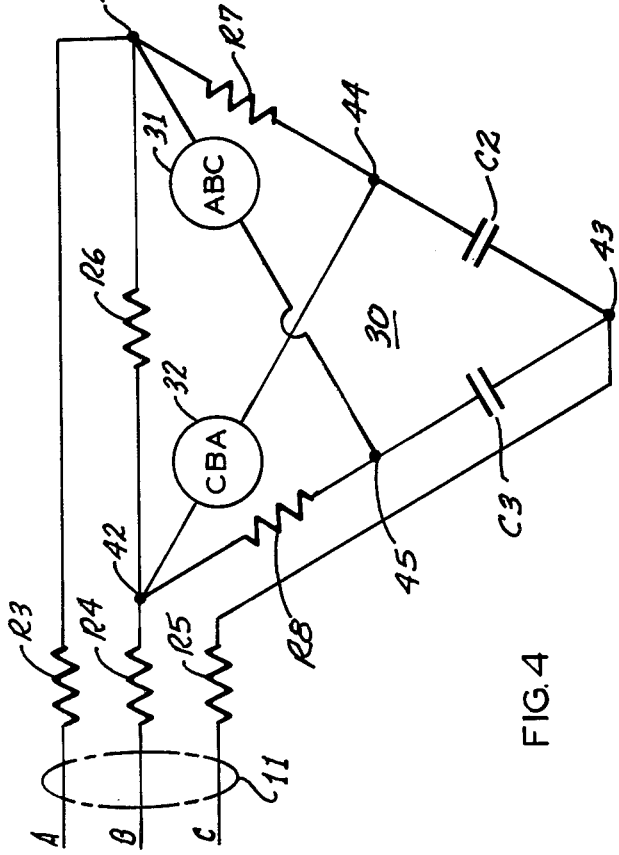
FIG. 4 is a schematic circuit diagram of certain phase detector circuitry which may be employed in the embodiment of FIG. 3.

Referring now to FIG. 4, there is illustrated a schematic circuit diagram of phase detector and signaling circuitry for use in the apparatus of FIG. 3. Such circuitry includes three input resistors R3, R4 and R5, respectively interconnecting the phase inputs individually designated A, B, C with nodes 41, 42 and 43 of the circuit. Extending between nodes 41 and 42 is a resistor R6. A branch extending between nodes 41 and 43 includes a resistor R7 and a capacitor C2, there being a circuit node 44 between the latter two elements. Light 32 is constituted by an incandescent bulb interconnected between nodes 92 and 44. Similarly, a circuit branch comprising a resistor R8 and capacitor C3 extends between circuit nodes 42 and 43. A node 45 is provided between these two elements. Bulb 31, similarly of an incandescent nature, is connected between nodes 41 and 45.

As a consequence of the vector addition of voltages produced across circuit nodes 41 and 45 of this resistive-capacitive circuit, light 31 is illuminated if the desired phase sequence ABC intended to be provided to this circuit results from proper interconnection of AC input leads L1, L2 and L3. On the other hand, if an incorrect wiring interconnection is made to the AC source, an incorrect phase relationship will provide vector addition of the voltages thus produced to illuminate bulb 32 which bridges nodes 42 and 44. Thus, the latter two nodes may be deemed to be output nodes of the circuit for indicating an improper phase relationship, since bulb 32 will signal such result.

The phase detector and signalling circuitry of FIG. 4 shares with that of FIG. 1 the common attribute of comprising a resistive-capacitive network including first and second circuit nodes, there being a first circuit branch connecting one of the inputs of said network with said first node, there being a second circuit branch including a capacitance connecting another of said inputs of said network with said second node and there being a third circuit branch containing a resistance connecting yet another of said inputs of said network with said second node. The first and second nodes constitute the two outputs of said network. Such attribute is also true of the corresponding circuitry of FIG. 6, as will become understood from the description which follows and from comparing the drawings. Moreover, these circuits share the attribute that the first circuit branch contains a resistance, and the first and third circuit branches are of a purely resistive nature. However, the third circuit branch includes a resistance in series with said capacitance.

Figure 5:
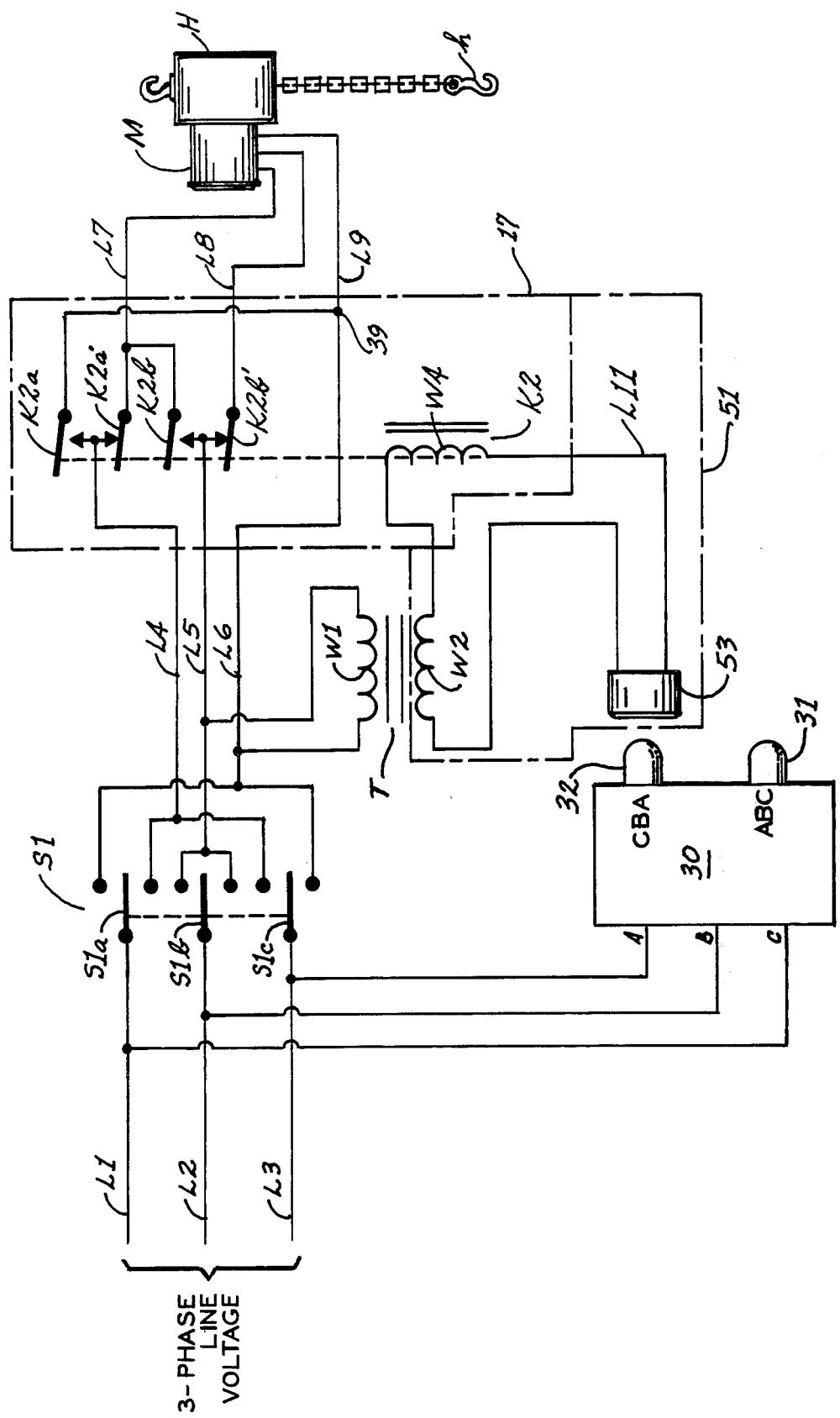
FIG. 5 is a schematic circuit diagram of another embodiment of the present invention shown interconnected with a three-phase AC hoist motor and a motor control switch.

FIG. 5 illustrates yet another embodiment employing a photocell as a means for functionally interconnecting the phase detector and signaling means 30 and the phase corrector means 17.

The apparatus of this embodiment may employ a phase detector and signaling means 30 of the same type as shown in FIG. 3. However, a different circuit arrangement illustrated by the block identified 51 is utilized for functionally interconnecting the phase detector, means 30 and the phase corrector relay circuit 17 for energizing the winding W4 of relay K2 upon a signal provided by light 32. Such signal is indicative of an improper phase relationship resulting from an incorrect wiring connection of input leads L1, L2 and L3.

In this embodiment, a photoresistive type of photocell 53 is employed of the type having a reduced resistance upon its receiving light from light source 32. This photocell is connected in a series circuit including winding W4 of relay K2. This series circuit further includes a voltage source constituted by the secondary winding W2 of transformer T, such transformer being of the same type as shown in FIG. 1 or of any other type suitable for providing a sufficient voltage for energizing relay winding W4 when the resistance of photocell 53 is sufficiently reduced by a signal from light 32.

As was true of the apparatus of FIG. 3, the embodiment illustrated in FIG. 5 may alternatively employ a voltage sensor 21 of the type shown in FIG. 2 in lieu of the relay arrangement shown, it being understood that such relay configuration is merely representative of one of the several ways in which the present apparatus may be connected and utilized.

The advantages of isolation and simplicity inherent in the apparatus of FIG. 3 are also provided by the apparatus of that of FIG. 5. In addition, the need for an amplifier or other device for providing sufficient amplification of the output of a photocell is obviated by virtue of the interconnection of secondary winding W2 with photocell 53 and, as a result, relatively few components are utilized yet provide for an inherently durable and long lasting circuit configuration.

Although it may be advantageous to provide a light signal such as that provided by light 31 when a correct phase sequence or phase relationship results from proper interconnection of input leads L1, L2 and L3 to the AC power source, it should be apparent that such light is not utilized for a purpose other than to provide a useful and convenient means of so indicating such proper interconnection. Accordingly, light 31 may be emitted if desired to save cost, when used, however, light 31 provides additional assurance of correct phasing.

Figure 6:
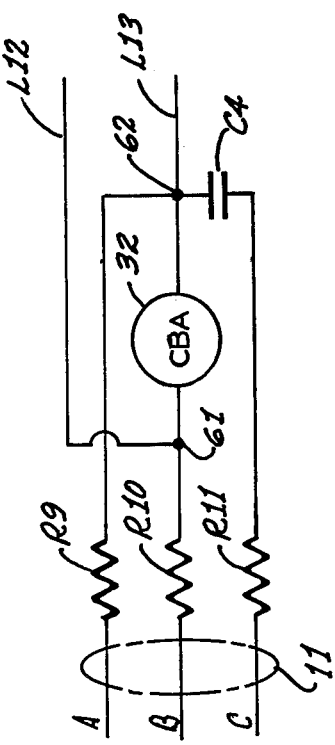
FIG. 6 is a schematic circuit diagram of certain phase detector circuitry which may be used in the embodiments of either FIG. 3 or FIG. 5.

FIG. 6 illustrates a circuit employing but a single light 32 for signaling an improper phase sequence CBA. In this circuit input resistors R9 and R10 respectively interconnect the inputs A and B of the phase detector circuitry with circuit nodes 61 and 62. Light 32 is connected with these two nodes. A third input resistor R11 interconnects input C with one side of a capacitor C4 which has its other side connected to circuit node 62. Accordingly, if there is an incorrect phase sequence CBA, the vector addition of the input voltages results in a sufficient average voltage between nodes 61 and 62 for energization of light 32.

It is within the province of the invention to utilize a direct connection of the phase detector circuitry of FIG. 6 as well as that of FIG. 4 with the phase corrector means of the invention, thereby obviating the need for a photocell and simplifying the circuitry at the expense of eliminating the visual signaling and the advantageous electrical isolation between the phase detector and phase corrector circuitry of the invention. FIG. 6 so illustrates that circuit leads L12 and L13 may be utilized as output leads from this resistive-capacitive phase detector and signaling circuitry. Such leads my be directly connected to a conventional relay such as shown in FIG. 1 or a voltage sensor relay as illustrated in FIG. 2, without use of a photocell.

It is also within the province of the invention to amplify the signal, if desired, which appears across leads L12 and L13 for the purpose of energizing a relay or other mechanism for interconnecting two of the motor leads in order to provide a corrected phase relationship of the three-phase power supplied thereto.

As thus described, the invention is amenable to use with many different kinds of motors, from fractional horsepower to large multiple horsepower industrial motors. In addition, it is contemplated that various hoist sizes may make advantageous usage of the invention, from the smaller hoists of about one-half ton capacity up to several tons lifting capacity. The motor driving such hoist may not necessarily be utilized for lifting the load, but may instead control the direction of movement of the hoist or control the direction of movement of a boom or the like, as in a drag line or other large crane.

In all of these many applications, three-phase motors if incorrectly phased will operate in an incorrect direction and thereby provide great possibility of damage to the equipment and presenting a very real and serious threat of injury to persons who operate the equipment or must work in the environment in which such equipment is utilized, where such persons are imperiled by any incorrect movement of the equipment resulting from an improperly phased connection.

Since all of the components of the equipment are of a simple and reliable nature, apparatus of the present invention may be utilized without great cost and is simple to incorporate on existing equipment. It may be constructed with reliable and inexpensive commercially available components. Thus, the apparatus of the invention is not only economical to construct but may be expected to be reliable and long lasting in operation.

In view of the foregoing, it is seen that the several objects of the invention are achieved and other advantageous results are attained.

Although the specific embodiments described or shown herein include a description of the best mode contemplated for carrying out the invention, various modifications and less preferred embodiments are presently contemplated. Accordingly, the foregoing description is intended to be illustrative, the scope of the invention being indicated by the following claims wherein all variations within the range of equivalence are intended to be encompassed.

Having described my invention what I claim and desire to obtain by Letters Patent is:

1. Safety apparatus for use with a three-phase AC reversible direction motor, said motor providing movement of a machine in one direction or the other dependent upon the direction of motor rotation, said motor adapted to be connected to a three-phase AC power source by a three-lead wiring connection for operating said motor, said motor having a plurality of motor leads interconnected with a multiple pole motor direction control switch, said direction control switch providing selective alternate closed positions for selective reversal of the direction of said motor for selectively controlling the direction of movement of said machine by phase connection reversal, said poles of said switch being connected to said three-phase AC power source by said three-lead AC wiring connection, said motor being adapted to operate in a correct direction if provided by AC power from said power source having a correct phase relationship and said motor being adapted to operate in an incorrect direction if provided by AC power form said power source having an incorrect phase relationship, said apparatus comprising phase detection means for detecting the phase relationship of said AC power provided by said wiring connection, said phase direction means including circuitry having three inputs respectively interconnected with the three leads of said wiring connection and having at least two outputs providing signal voltage between them having a first level indicative of a correct phase relationship provided by said wiring ocnnection but a second level indicative of said incorrect phase relationship provided by said wiring connection, a wiring connection adapted to be completed for connecting said phase detection means to said three-phase AC power source in predetermined phase connection relationship regardless of which of said alternate closed positions is provided by said direction control switch, relay means interconnected with sets of contacts of said direction control switch and adapted for being energized for completing said wiring connection only when said direction control switch is in one of said alternate closed positions, phase corrector means for receiving said signal voltage and comprising at least two sets of contacts interconnected with at least two of said motor leads, said sets of contacts being normally operative when said signal voltage has said first level to provide a first circuit interconnection of each of said two motor leads with a respective one of two of the leads with a respective opposite one of said two leads of said wiring connection, whereby said apparatus ensures movement of said machine in a selected direction of movement corresponding to selective operation of said direction control switch to either of said alternate closed positions regardless of any incorrect phase relationship provided by said wiring connection.

2. Safety apparatus as defined in claim 1, said phase corrector means comprising a relay adapted for operating said two sets of contacts interconnected with motor leads, said relay receiving said signal voltage of said first or second level only when the first said relay means in energized upon said direction control switch being in either of said alternate closed positions.

3. Safety apparatus as defined in claim 2, said phase detector circuitry comprising a resistive-capacitive network comprising first and second circuit nodes, a first circuit branch connecting one of said inputs of said network with said first node, a second circuit branch including a capacitance connecting another of said input of said networks with said second node, and a third of said inputs of said network with said second node, said first and second nodes providing said signal voltage.

4. Safety apparatus as defined in claim 2, said first level of said signal voltage being substantially greater than zero, said second level of said signal voltage being higher than said first level.

5. Safety apparatus as defined in claim 4, the last-said relay comprising a voltage sensor relay having preselectable pick-up and dropout voltages at which the contacts thereof are operated, said pick-up and dropout voltages being preselected for causing operation of the sets of contacts thereof according to whether said signal voltage is at said first level or said second level, respectively.

6. Safety apparatus as defined in claim 2, said phase detector means comprising a resistive-capacitive circuit including three input resistors respectively interconnecting the three leads of said wiring connection with first, second, and third nodes of said circuit, a first branch having a resistor extending between the first and second nodes, a second branch extending between the first and third nodes including a resistor and capacitor interconnected in series to form therebetween a fourth node of said circuit, a resistive circuit including a first light source connected between the first and fourth nodes for being illuminated for signalling purposes if a correct phase relationship is provided, a third branch extending between the second and third nodes including a resistor and capacitor interconnected in series to form therebetween a fifth node of said circuit, a resistive circuit including a second light source connected between the second and fifth nodes for being illuminated for signalling purposes if an incorrect phase relationship is provided, a photocell device positioned for being illuminated by said second light source, the last-said relay being connected for operation in response to illumination of said photocell device.

7. Safety apparatus as defined in claim 6 further comprising a step-down transformer having a primary winding connected for being provided with AC power only upon movement of said direction control switch to either of said alternate closed positions and a secondary winding for providing power to said photocell device.

8. Safety apparatus as defined in claim 7, said relay having a winding adapted for being energized to control operation of said two sets of contacts interconnected with motor leads, said relay winding, said photocell device and step-down transformer secondary winding being connected in series.

9. Safety apparatus as defined in claim 1, said three-phase AC motor comprising a reversible direction hoist motor, said machine being constituted by a hoist.

* * * * *

UNITED STATES PATENT OFFICE
CERTIFICATE OF CORRECTION

Patent No. 4,163,270            Dated July 31, 1979

Inventor(s) Louis J. Marus

It is certified that error appears in the above-identified patent and that said Letters Patent are hereby corrected as shown below:

Column 11, claim 1, line 65, "form" should be ---from---; column 12, claim 1, line 6, "ocnnection" should be ---connection---.

Column 12, claim 2, line 36, "in" should be ---is---.

Signed and Sealed this

Thirtieth Day of October 1979

[SEAL]

*Attest:*

RUTH C. MASON
*Attesting Officer*

LUTRELLE F. PARKER
*Acting Commissioner of Patents and Trademarks*